(12) United States Patent
    Horriat

(10) Patent No.: US 10,557,410 B2
(45) Date of Patent: Feb. 11, 2020

(54) APPARATUS AND METHOD FOR ENGINE CLEANING

(71) Applicant: Parviz R Horriat, Mission Viejo, CA (US)

(72) Inventor: Parviz R Horriat, Mission Viejo, CA (US)

( * ) Notice: Subject to any disclaimer, the term of this patent is extended or adjusted under 35 U.S.C. 154(b) by 225 days.

(21) Appl. No.: 15/413,234

(22) Filed: Jan. 23, 2017

(65) Prior Publication Data

US 2018/0209333 A1   Jul. 26, 2018

(51) Int. Cl.
| | |
|---|---|
| *F02B 77/04* | (2006.01) |
| *F01M 11/04* | (2006.01) |
| *F16N 31/00* | (2006.01) |
| *F16N 33/00* | (2006.01) |

(52) U.S. Cl.
CPC ............. *F02B 77/04* (2013.01); *F01M 11/04* (2013.01); *F01M 11/045* (2013.01); *F16N 31/00* (2013.01); *F02B 2077/045* (2013.01); *F16N 2033/005* (2013.01)

(58) Field of Classification Search
CPC .................................................. F02B 2077/045
See application file for complete search history.

(56) References Cited

U.S. PATENT DOCUMENTS

| | | | |
|---|---|---|---|
| 6,263,889 B1 * | 7/2001 | Flynn | F02B 77/04 134/102.2 |
| 6,298,947 B1 | 10/2001 | Flynn | |
| 6,663,718 B1 | 12/2003 | Mush | |
| 6,752,159 B1 * | 6/2004 | Kavadeles | B08B 9/0321 134/102.2 |

* cited by examiner

*Primary Examiner* — Michael E Barr
*Assistant Examiner* — Jason P Riggleman
(74) *Attorney, Agent, or Firm* — Morland C. Fischer

(57) ABSTRACT

An apparatus configured to perform a static and a dynamic cleaning of an engine at the same time or separately, as well as to back-flush the oil pump screen of the engine, air purging the engine and prime the engine with oil before filling the engine with the required oil amount. The apparatus has a holding tank for storing a cleaning solution, a pump, an oil drain adapter configured to connect the apparatus to the oil drain of the engine, a transfer tank and an oil filter adapter connected to a first and a second conduit. The pump is selectively in fluid communication with the holding tank, to pump the cleaning solution from the holding tank into the engine, and with the oil drain to draw the cleaning solution out of the engine.

11 Claims, 10 Drawing Sheets

APPARATUS AND METHOD FOR ENGINE CLEANING

BACKGROUND OF INVENTION

1. Field of the Invention

The invention relates generally to methods and systems for cleaning engines and more particularly to methods and systems for cleaning engines internally using a cleaning solution and compressed air.

2. Description of the Related Art

It is known that for an engine to function efficiently, heavy sludges that accumulate over time in the engine need to be removed and filtered. While there are known methods for cleaning engines, they appear to have several deficiencies. First, some stubborn sludges appear to remain inside the engine after a regular engine cleaning. Secondly, when the cleaning is done using known methods, the oil pump screen often remains clogged with sludge, which may reduce oil pressure and thus potentially damage the engine. Third, some cleaning solution remains in the engine after the regular cleaning and gets mixed with the new motor oil. This can also damage the engine and can contaminate the oil. Lastly, when the motor oil is added to the engine after the regular cleaning and the engine is started, often there is a lag bet ore the oil is pumped to all oil paths of the engine. During this lag, components of the engine can be damaged. Thus, there is a need for a new and improved method and apparatus for cleaning engines that can solve the problems outlined above.

BRIEF INVENTION SUMMARY

In one preferred embodiment, an apparatus for cleaning an engine is provided. A typical engine includes an oil drain, an oil filter receiving seat for mounting thereon an oil filter, one or more oil paths, an oil pump screen, and an oil pump for drawing oil through the oil pump screen and pumping the oil through the oil filter into the oil paths. The cleaning apparatus herein disclosed has a holding tank for storing a cleaning solution, a pump, an oil drain adapter configured to connect the apparatus to the oil drain of the engine, a transfer tank and an oil filter adapter connected to a first and a second conduit, the oil filter adapter being configured to connect the cleaning apparatus to the oil filter receiving seat of the engine. The pump of the apparatus can be in fluid communication with the holding tank, to pump the cleaning solution from the holding tank into the engine. The pump can also communicate with the oil drain to draw the cleaning solution out of the engine. Further, the pump can communicate with the transfer tank of the apparatus.

The transfer tank can communicate with the first and second conduit and further with the oil pump of the engine via the second conduit and with the oil paths of the engine via the first conduit when the oil filter adapter is connected to the oil filter receiving seat of the engine. The apparatus is thus configured to be capable of performing a static and a dynamic cleaning of the engine at the same time by actuating the pump of the apparatus to draw the cleaning solution from the engine via the oil drain and pump the same into the transfer tank, and turning the engine on to cause the engine's oil pump to pump the cleaning solution out of the engine via the second conduit into the transfer tank. From the transfer tank, the cleaning solution is then forced back into the engine via the first conduit to clean the engine.

The simultaneous static and dynamic cleaning of the engine provides the advantages of cleaning more areas of the engine, other than the oil paths and presents clogging of the oil screen of the engine.

The apparatus may also include means for back-flush cleaning an oil pump screen of the engine. An advantage is that better oil pressure and volume is available to the engine after the cleaning.

The apparatus may also have means for air purging the engine of any remaining cleaning solution after the cleaning is complete. An advantage is that cleaner replacement oil will be available to the engine.

The apparatus may also include means for using compressed air to prime the engine with oil prior to adding to the engine a required oil amount and starting the engine. An advantage is that potential harm to components of the engine is prevented during the lag in which some engine components are deprived of oil after a cleaning and oil change.

The above aspects or examples and advantages, as well as other aspects or examples and advantages, will become apparent from the ensuing description and accompanying drawings.

BRIEF DESCRIPTION OF THE DRAWINGS

Elements in the figures have not necessarily been drawn to scale in order to enhance their clarity and improve understanding of these various elements and exemplary embodiments of the invention. Furthermore, elements that are known to be common and well understood to those in the industry are not depicted in order to provide a clear view of the various exemplary embodiments of the invention, thus the drawings are generalized in form in the interest of clarity and conciseness. For exemplification purposes, and not for limitation purposes, aspects, embodiments or examples of the invention are illustrated in the figures of the accompanying drawings, in which.

DETAILED DESCRIPTION OF THE PREFERRED EMBODIMENTS

Figure 1:
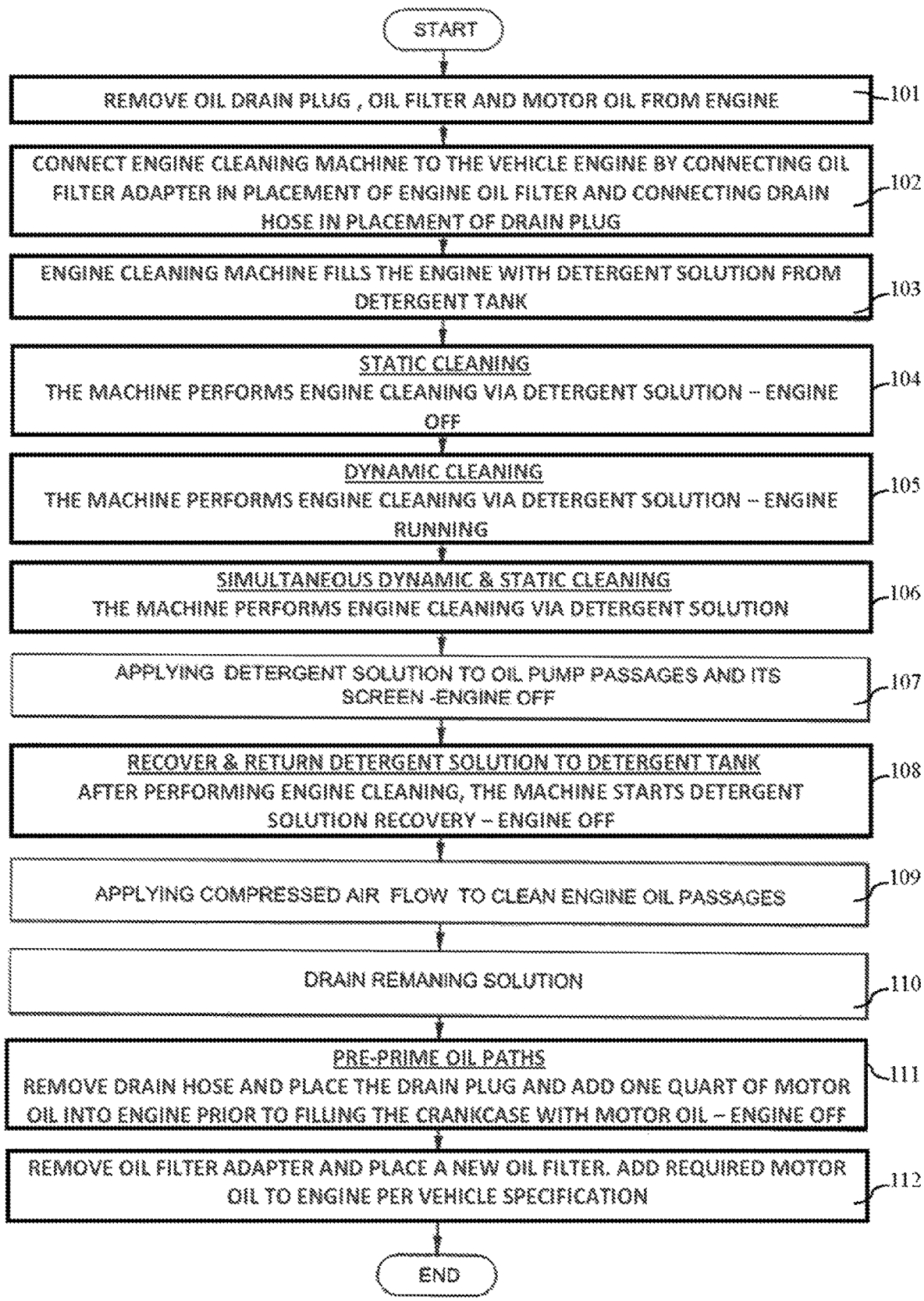
FIG. 1 is a flow chart depicting an exemplary process for engine cleaning, according to an embodiment of the invention.

What follows is a description of various embodiments and/or examples in which the invention may be practiced. Reference will be made to the attached drawings, and the information included in the drawings is part of this detailed description.

Reference will concurrently be made to FIG. 1-10 of the drawings. Again, FIG. 1 is a flow chart depicting an exemplary process for engine cleaning, according to an embodiment of the invention. FIGS. 2-10 illustrate schematically a system for cleaning an engine during various cleaning steps, according to several embodiments of the invention, which will be described in detail hereinafter.

As shown in FIG. 1, a typical process of cleaning an engine begins (step 101) with removing the vehicle's engine motor oil and oil filter. What follows are steps that may be used to clean an engine 10 using the machine/system 70 depicted in FIGS. 2-10. Specifically, a technician/user starts the cleaning process by connecting (step 102) the engine cleaning machine 70 (see FIG. 2) to the vehicle engine 10 by connecting an oil filter adapter 15 into the engine's oil filter receiving seat 16 and connecting an oil drain adapter hose 14 to the engine oil drain 13.

Next, the engine cleaning machine 70 is started by, for example, actuating a switch 51. The machine 70 may be configured (step 103) to draw from a cleaning solution holding tank 40 ("holding tank") and "fill up" the engine 10 with a cleaning solution 40*a* (e.g., detergent solution, detergent/oil mixture, etc.). It should be noted in FIG. 2 and subsequent FIGS. 3-10 that the engine cleaning machine/system 70 includes a plurality of conduits configured to form various circuits for fluid flow, according to the operational state of the machine 70. It should also be noted that conduits which are active to a particular state are depicted by darkened colors and the direction of flow of the fluid (e.g., cleaning solution, oil or air) is depicted by arrows. Thus, when looking at FIG. 2, it can be observed that in this operational state of the apparatus 70, the fluid (a cleaning solution) 40*a* is drawn from the cleaning solution holding tank 40 (first tank) by a machine pump 44 and pushed initially into a transfer tank 21 (second tank) and then into engine 10 via the oil filter adapter 15.

Figure 2:
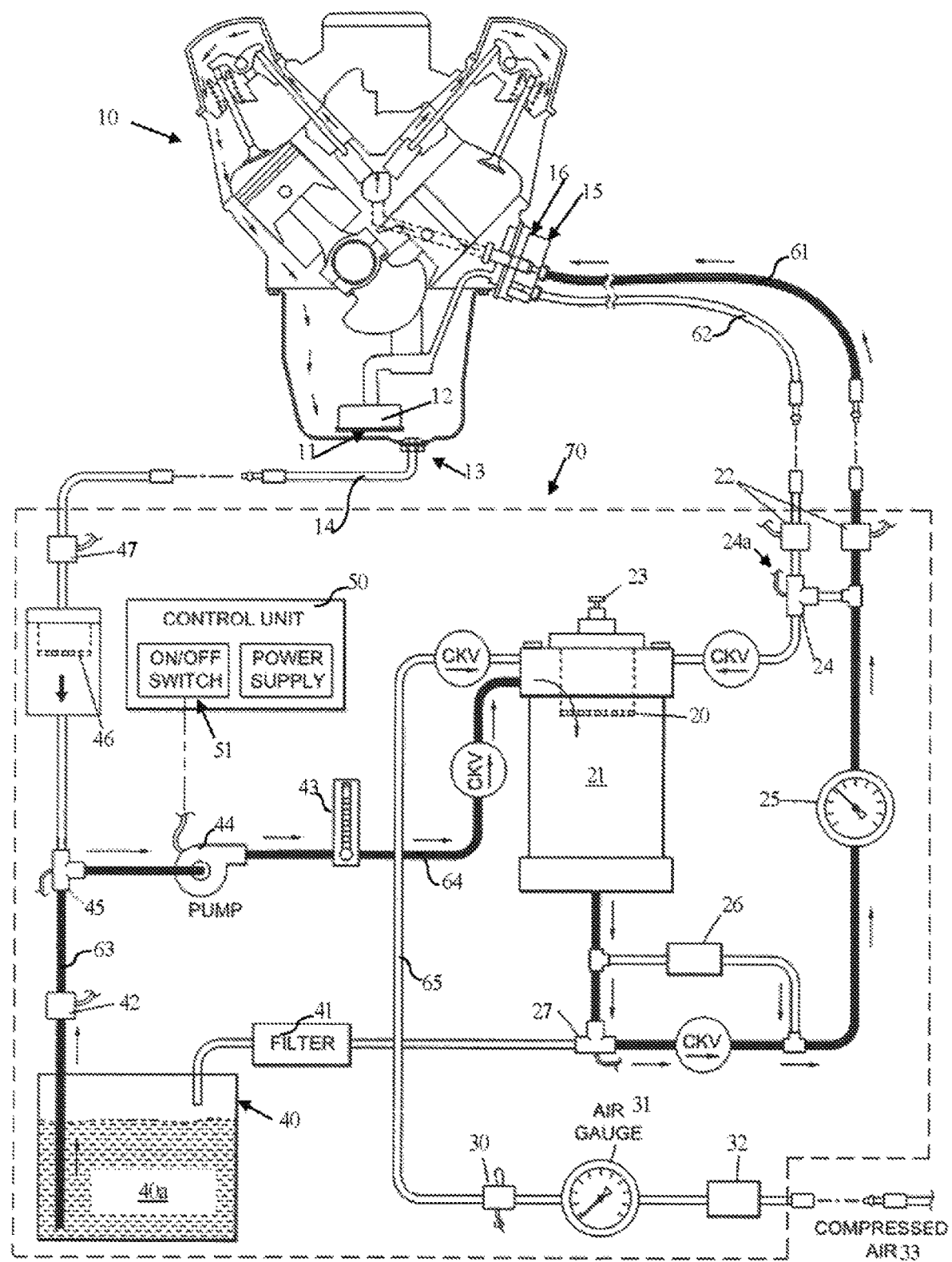
FIGS. 2-10 illustrate schematically a system for cleaning an engine during various cleaning steps, according to several embodiments of the invention.

It should be noted that along the conduits associated with this fluid path, one or more 3-way valves 45, 27 and one or more check/unidirectional, valves (labeled "CKV") may be used to ensure the fluid is traveling via the designated conduits as well as in the desired direction for this operational stage of the machine 70 (FIG. 2). Also, as shown, fluid volume sensors 42 and flow sensors 22, 47 may be mounted on the conduits before and/or after transfer tank 21 to monitor and report to a control unit 50 the volume pumped by pump 44 and the rate of fluid flow, respectively. The control unit 50 may be configured to for example shut down the machine 70 in case of a malfunction, such as when the flow rate is below or above a desired level. Also, the control unit 50 may be configured to stop pump 44 when the fluid volume sensor 42 reports that a fluid volume of cleaning solution, which was previously inputted into the control unit 50, was pumped into the engine 10. Further, a flow meter 43 and/or pressure gauge 25 may be used to visually monitor the flow rate and/or pressure throughout the apparatus 70.

The "filling" of engine 10 with cleaning solution 40*a* is preferably done with the engine 10 off. Typically, a quantity of cleaning solution that is equal to the quantity of oil prescribed for the particular engine (e.g., six quarts) may be used to "fill up" the engine.

It should be noted in FIG. 2 that the cleaning solution 40*a* may be passed through a filter 20 before reaching engine 10, to prevent unacceptable impurities from entering the engine 10.

As will be described in greater detail below, the machine 70 is configured to perform static engine cleaning (step 104), dynamic engine cleaning (step 105) and/or simultaneous dynamic and static engine cleaning (step 106). It should be understood that the step order shown in FIG. 1, namely, static-dynamic-static/dynamic cleaning, is an example only. In practice, the engine cleaning process may include these three steps (static, dynamic and static-dynamic), in this or another order, only two of the steps, or only one step. The decision as to which and how many cleaning steps to use and in what order may be made by the technician performing the cleaning of the engine 10. For example, if the engine 10 is very dirty, typically a dynamic engine cleaning or a simultaneous dynamic and static cleaning would be performed. The latter is a more effective and safer engine cleaning, as will be described hereinafter.

Figure 3:
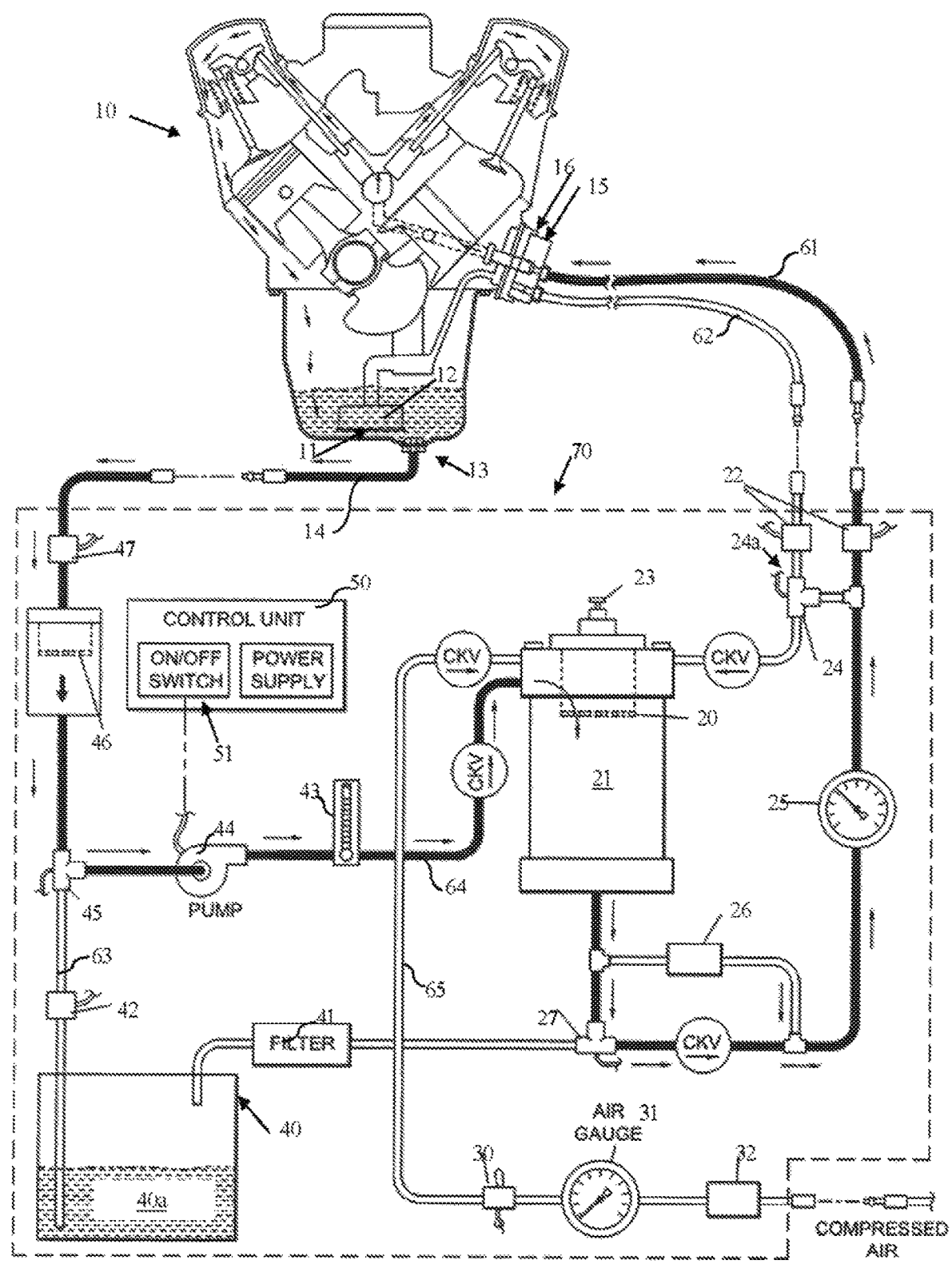

During the static cleaning (step 104), the machine 70 performs engine cleaning using the cleaning solution 40*a* while the engine 10 is off. Typically, the static cleaning of the engine 10 takes 15-20 minutes. The active (darkened) conduits and the direction of flow of the cleaning solution for this step of the engine cleaning process are shown in FIG. 3. It will be noted that for this step, the 3-way valve 45 is manually or automatically (e.g., by control unit 50 when the 3-way valve 45 is a solenoid valve) set to interrupt fluid communication with cleaning solution holding tank 40 and open fluid communication with engine 10 via oil drain 13 and oil drain adapter 14. As shown, in this step, the machine pump 44 draws the cleaning solution from the engine 10 via the oil drain adapter 14 and pumps it back into the engine 10 and its oil paths (see arrows inside engine 10) via oil filter adapter 15. The pressure of the cleaning solution during the static cleaning, which may be detected by the pressure gauge 25, would be that of pump 44, which, as an example, could be 55 psi. It should be noted that a filter 46 may be used to filter the cleaning solution coming from engine 10 of impurities collected from the engine and prevent them from reaching pump 44 and from going back into the engine 10.

Figure 4:
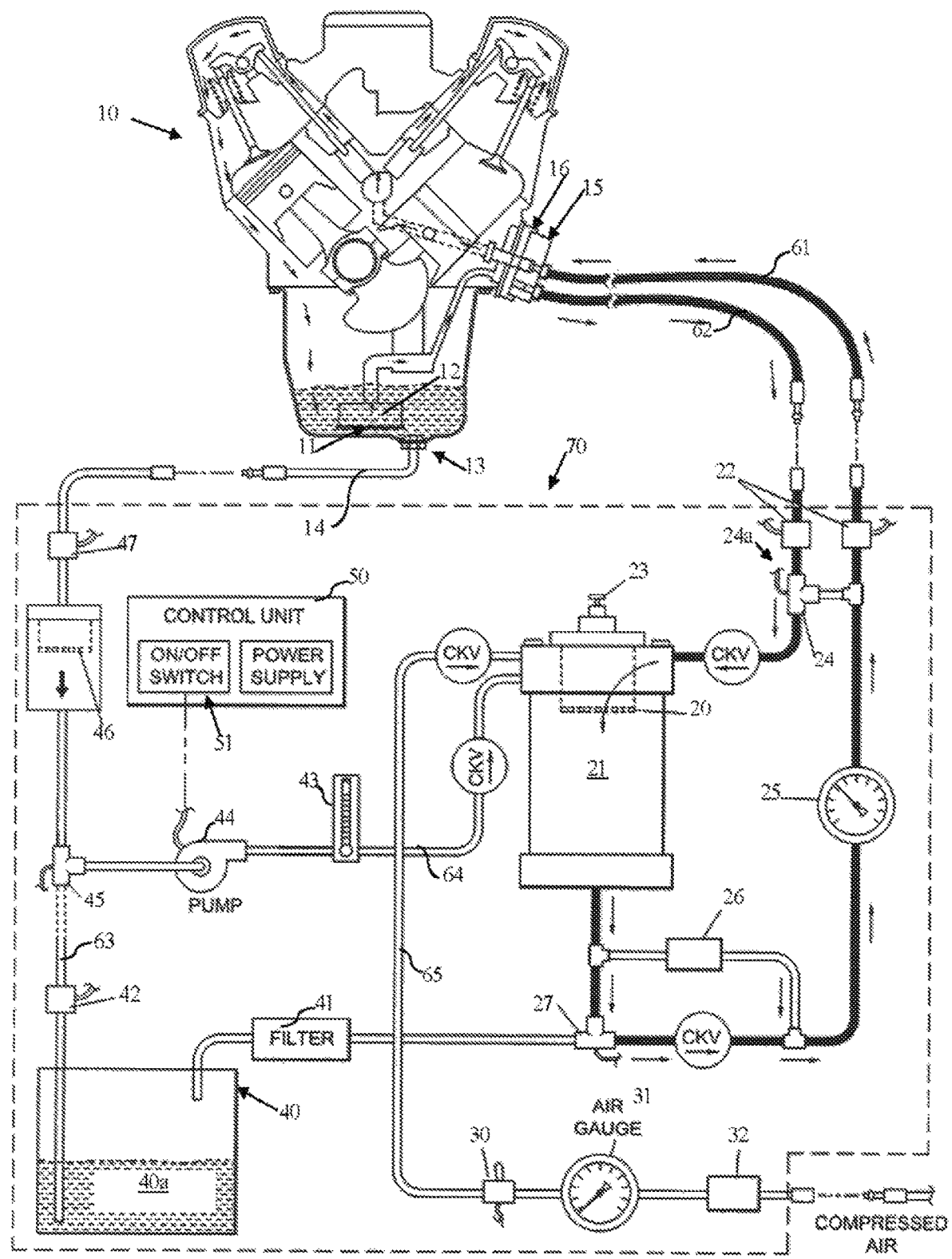

For dynamic cleaning (step 105), the engine 10 is running while the machine 70 is performing the engine cleaning using the cleaning solution. Typically, the dynamic cleaning takes 30-40 minutes. The pressure of the cleaning solution during she dynamic cleaning, which may be defected by the pressure gauge 25, would be the pressure of the engine oil pump 12, which, in a car engine is typically 35-40 psi. The active (darkened) conduits and the direction of flow of the cleaning solution for this step of the engine cleaning process (dynamic cleaning) are shown in FIG. 4. As shown, during this step, the cleaning machine 70 communicates with the engine 10 exclusively through the filter adapter 15 via the inlet (top or first) conduit 61 and outlet (bottom or second) conduit 62 associated with the filter adapter 15. Since the engine 10 is running during this cleaning, the engine oil pump 12 is used to recirculate the cleaning solution through the engine 10 and filter it via transfer filler 20 of the transfer tank 21 of cleaning machine 70. It should be noted that the rest of the cleaning machine 70 is isolated in this step via, for example, the 3-way valves 45, 27. As shown, the engine's oil pump 12 can draw the cleaning solution from the bottom of engine 10 via oil pump screen 11 and pump it through the outlet conduit (bottom or second conduit) 62 associated with filter adapter 15 and the filter 20 of transfer tank 21. The cleaning solution is then returned back to the engine 10 including its oil paths (see arrows inside engine 10) via the inlet (top or first) conduit 61 associated with filter adapter 15.

It should be noted that a bypass valve 26 may be used as a safety measure in case the 3-way valve 27 malfunctions and does not allow fluid (cleaning solution or oil) to flow to the engine 10. This prevents damage to the engine because of running dry or because of lack of proper pressure of the cleaning solution. The bypass valve 26 may be configured to open at a preselected pressure (e.g., 75 psi).

A more effective and safer engine cleaning may be achieved during a combined, simultaneous dynamic and static cleaning (step 106), which the machine/apparatus 70 described herein is also configured to perform. This is in part because both pumps, the machine pump 44 and the engine oil pump 12, are active in this step, causing the cleaning solution to reach more areas of the engine 10. For example, because the engine 10 and the engine oil pump 12 are running, a splashing effect occurs inside the engine 10 causing parts of the engine 10 other than the oil paths to be reached by the cleaning solution, and thus cleaned. Further, it is known that, when the dynamic cleaning is performed separately, the oil pomp screen 11 may get clogged with sludges that are collected by the cleaning solution at the bottom of the engine 10. This may deprive the engine 10 of full pressure of the cleaning solution, which may not only decrease the effectiveness of the dynamic cleaning but also potentially harm the engine 10. The simultaneous static and dynamic cleaning advantageously prevents or alleviates this problem because pump 44 simultaneously and continuously draws the dirty cleaning solution and sludges out of the engine 10 via drain 13, and filters it out via, for example, filters 46, 20, before pumping it clean back into the engine 10.

Figure 5:
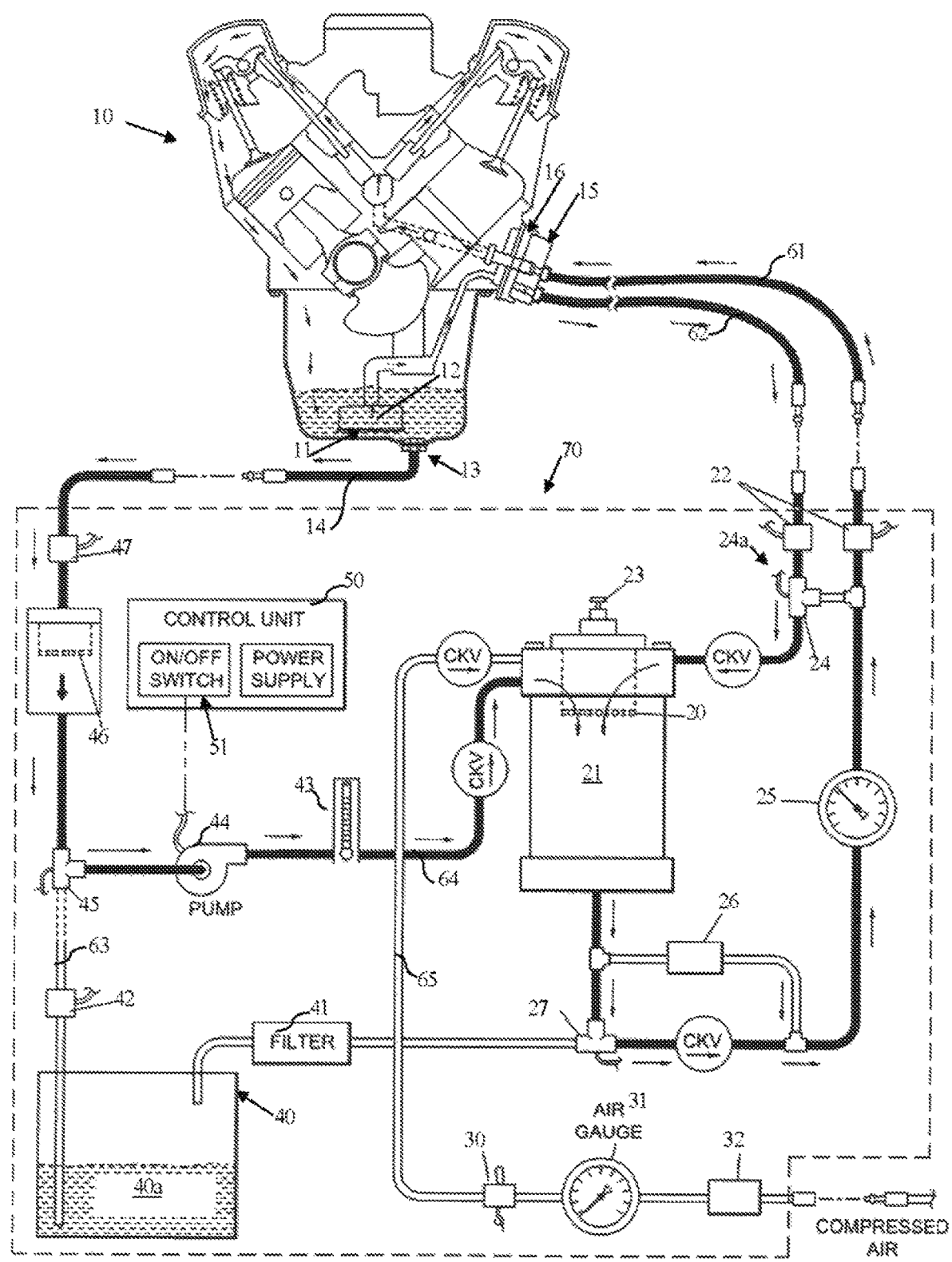

The simultaneous static and dynamic cleaning step may take for example between thirty (30) to forty-five (45) minutes. The active (darkened) conduits and the direction of flow of the cleaning solution for this step of the engine cleaning process (dynamic cleaning) are shown in FIG. 5. As shown, in this step, the engine cleaning machine 70 is configured to clean the engine 10 while taking ad vantage of the combined action of the machine's own pump 44 and the engine's oil pump 12 as described hereinbefore when referring to FIG. 3 and FIG. 4. Specifically, as shown in FIG. 5, the cleaning solution is drawn by machine pump 44 from the engine 10 via the engine oil drain 13 and pumped into the transfer tank 21. During the same time, the cleaning solution is pumped by the engine oil pomp 12 into the transfer tank 21 via the outlet/lower conduit 62 of the filter adapter 15. From the transfer tank 21, the cleaning solution is that forced to return to engine 10 via the upper/inlet conduit 61 of the filter adapter 15, so as to irrigate and clean the engine oil paths depicted by the arrows inside the engine 10, as well as other areas of the engine 10 as described above (e.g., splashing effect).

Figure 6:
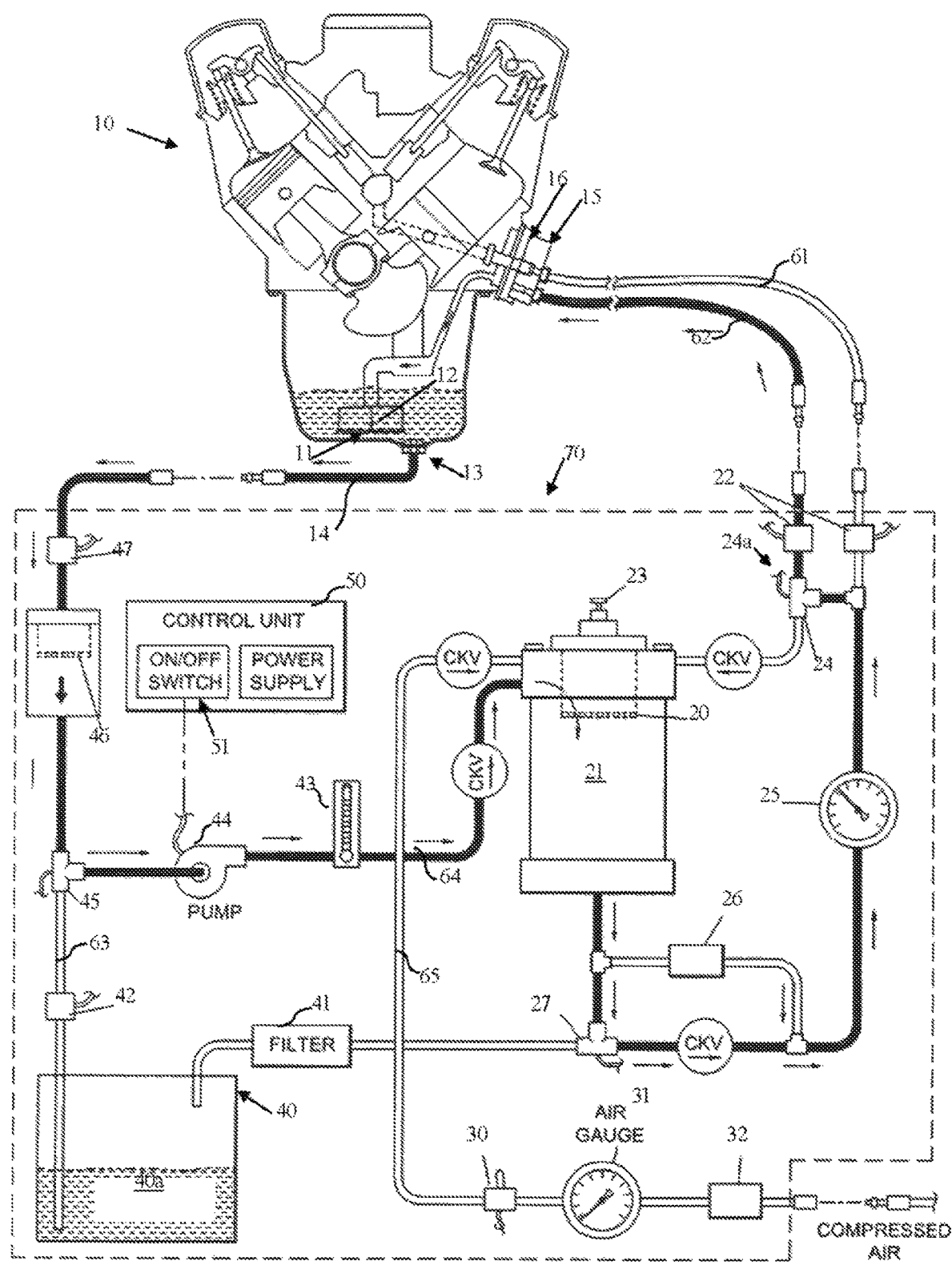

Next, in step 107, the machine 70 is configured to apply the cleaning solution to the oil pump paths and the oil pump screen 11 while the engine 10 is off. This is an important step because, using conventional engine cleaning methods, the oil pump screen 11 often remains dirty and/or partially clogged at the end of the engine cleaning, which can deprive the engine of adequate oil pressure and oil volume. The process and the machine 10 disclosed herein advantageously eliminates this shortcoming. This step of the engine cleaning process may take for example 5 (five) minutes. The active (darkened) conduits and the direction of flow of the cleaning solution for this step of the engine cleaning process (oil pump screen cleaning) are shown in FIG. 6. As shown, in this step the machine 70 is configured such that the machine pump 44 draws the cleaning solution from the bottom of engine 10 via the drain 13 and pumps it into transfer tank 21. From the transfer tank 21, the cleaning solution is forced (because of the pressure buildup in transfer tank 21) to return to engine 10 via filter adapter 15. The cleaning solution is then forced down toward oil pump screen 11, thus opposite the usual, upward travel of motor oil through oil pump screen 11. This back-flush of the oil pump screen 11 is an effective way to clean the oil pump screen 11.

Figure 7:
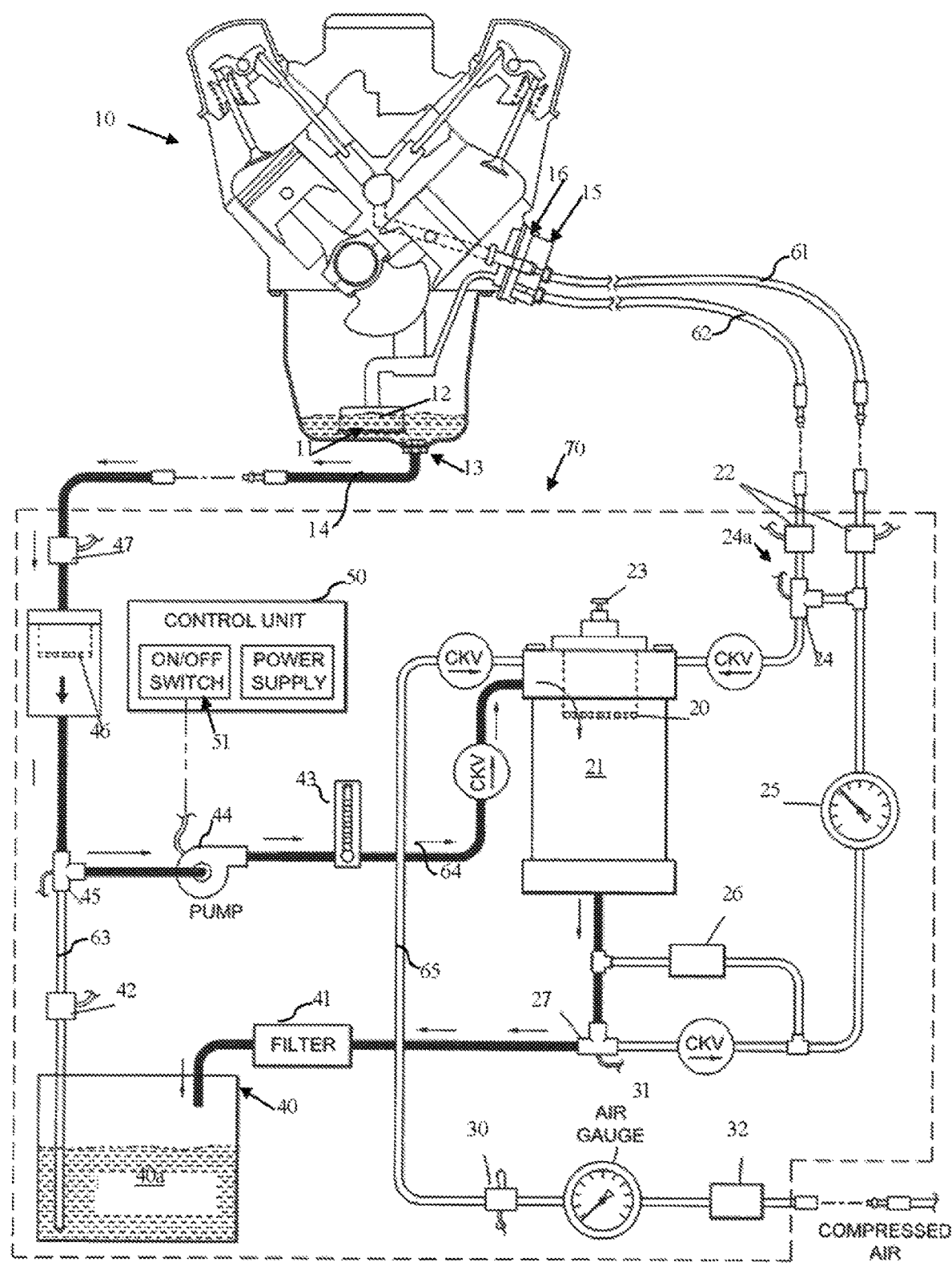

In step 108, tire machine 70 is configured to recover and return the cleaning solution the holding tank 40, while the engine 10 is off. The active (darkened) conduits and the direction of flow of the cleaning solution for this step of the engine cleaning process are shown in FIG. 7. As shown in FIG. 7, in this step 108, the machine pump 44 draws the cleaning solution from the engine 10 via drain 13 and pumps it in the transfer tank 21. From transfer tank 21 the cleaning solution is released into the cleaning solution holding tank 40. It should be noted that during these steps, the cleaning solution may be passed through a series of tillers 46, 20, 41, so that the cleaning solution can be reused. It should also be noted that, for this step, the 3-way valves 45, 27 are actuated, either manually or automatically, to ensure the cleaning solution follows the darkened conduit path depicted in FIG. 7.

The holding tank 40 may be configured to receive, for example, twenty (20) liters ("L") of cleaning solution 40a from a twenty (20) liter container (not shown) labeled with a barcode. A technician may be required to scarf the barcode using the control unit 50, which would have a barcode scanner (not shown), before each service. The control unit 50 may be configured to accept the same barcode only a certain number of times (e.g., 20 times) to help prevent the use of the same cleaning solution 40a more than the prescribed number of times (i.e., 20 times in this example).

Figure 8:
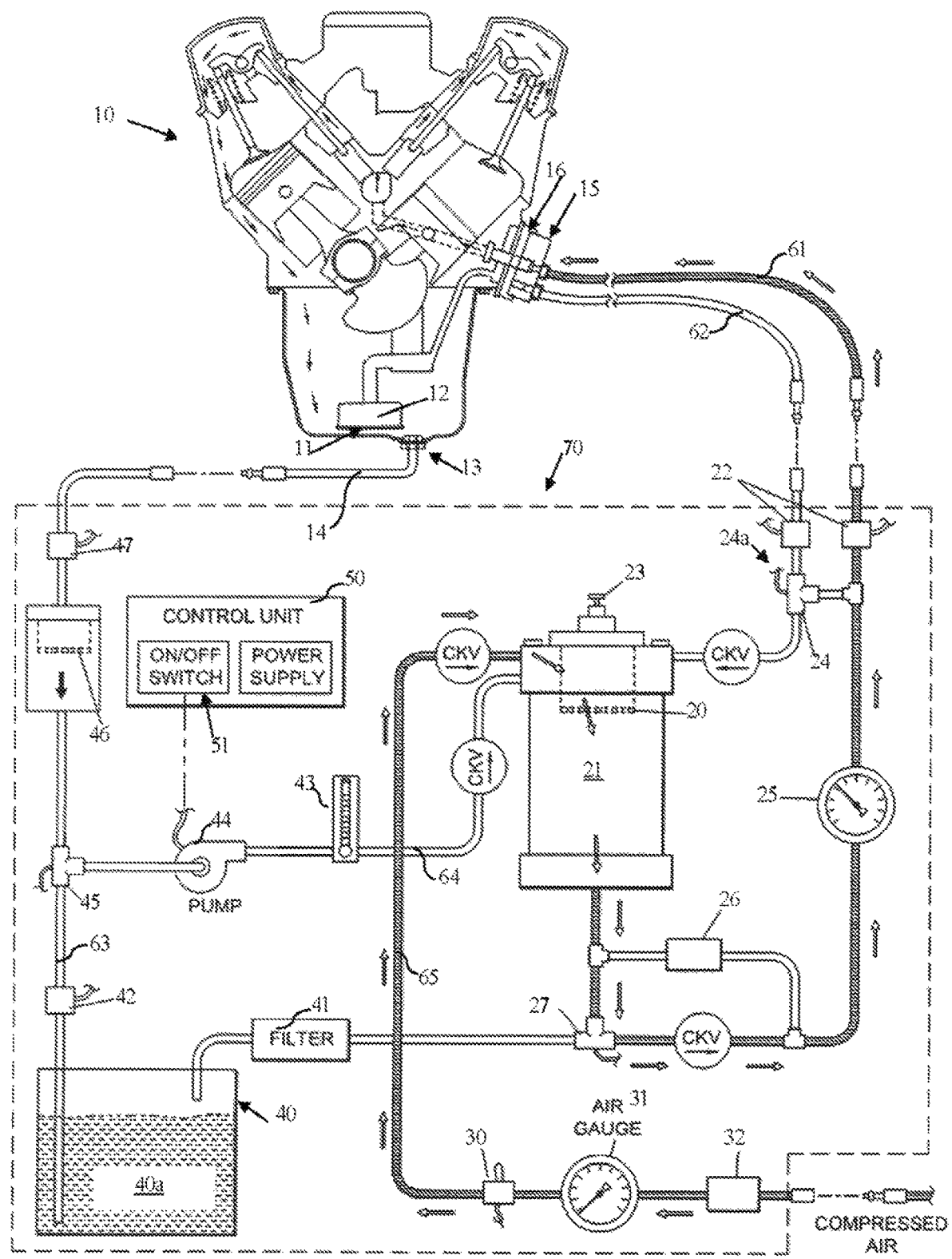

In step 109, the engine oil paths are cleaned of residual cleaning solution by applying compressed air flow thereto. This step of the engine cleaning process may take for example 30 (thirty) seconds while the engine 10 is off. The active (darkened) conduits and the direction of flow of the air for this step of the engine cleaning process are shown in FIG. 8. As shown, in this step, compressed air from a source such as a compressor (not shown) may fee released, by actuating for example a switch 30, into the transfer tank 21. From transfer tank 21, with the help of the 3-way valve 27, the compressed air may be directed into the engine 10 via upper/inlet conduit 61 of the filter adapter 15. Under the action of the pressurized air released into the engine 10, the oil paths in the engine will be cleaned of residual cleaning solution which, for example, under the influence of gravity, may accumulate at the bottom of the engine 10. As shown in FIG. 8, in order to better control this step of the process, an air pressure regulator 32 and an air gauge 31 (for visual monitoring of the air pressure) may be used. An example of air pressure level that may be used here is 35 psi.

Figure 9:
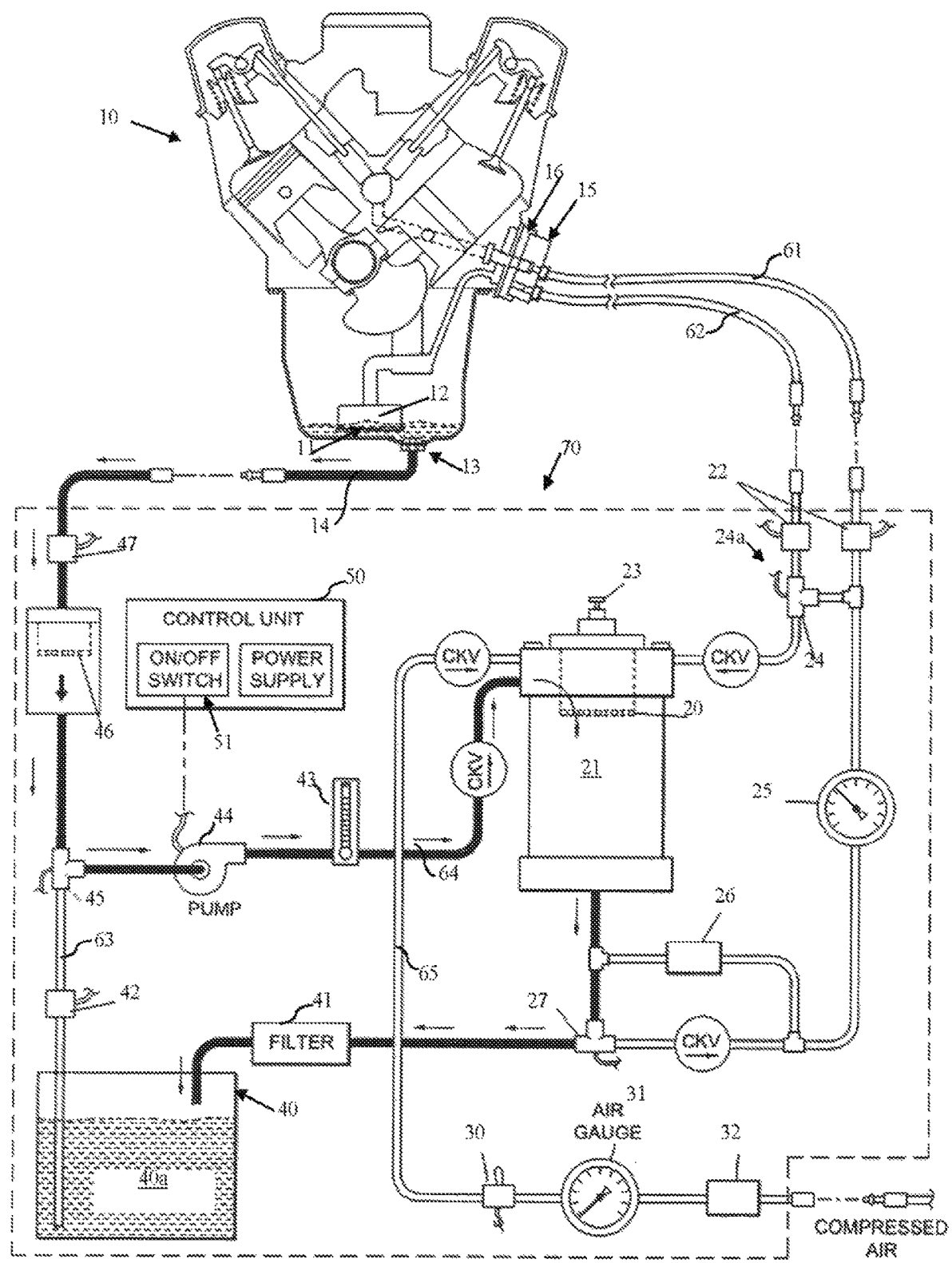

In step 110, while the engine is off, the residual cleaning solution is recovered through the engine oil drain 13 into the cleaning solution holding tank 40 after the air purge described above when referring to FIG. 8. The active (darkened) conduits and the direction of flow of the cleaning solution for this step of the engine cleaning process are shown in FIG. 9. As shown in FIG. 9, in this step, the machine pump 44 draws the residual cleaning solution from the engine 10 via drain 13 and pumps it into the transfer tank 21. From tank 21, the cleaning solution is released, into the cleaning solution holding tank 40. It should be noted again that during these steps, the cleaning solution may be passed through a series of filters 46, 20, 41, so that the cleaning solution can be reused. It should also be noted that during this step, the 3-way valves 45, 27 are actuated, either manually or automatically, to ensure that the cleaning solution follows the darkened conduit path depicted in FIG. 9.

Figure 10:
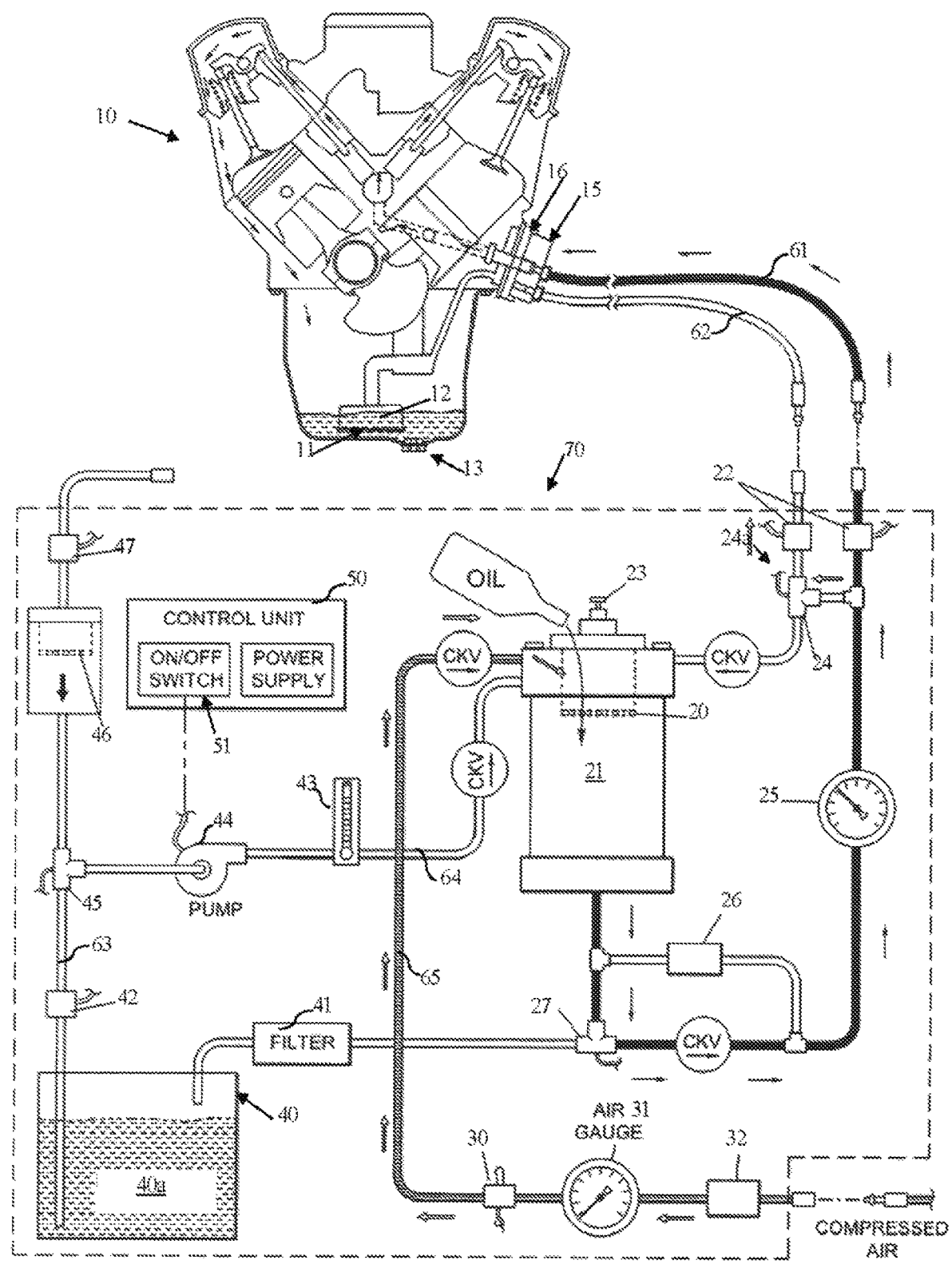

In step 111, while the engine is off, the engine oil paths are primed. To do so, the drain hose adapter 14 is removed as shown in FIG. 10 and a drain plug is secured into the oil drain 13. As shown in FIG. 10, one quart (as an example) of motor oil may be added to the transfer tank 21 of the engine cleaning machine 70 and forced into the engine's oil paths, while the engine is off, by the compressed air released into the transfer tank 21 after the addition thereto of the motor oil. An example of air pressure that can be used for this step is 35 psi. This engine priming step has the benefit of preventing engine components from running dry, and thus from being damaged, for a few moments before the engine's oil pump 12 can pump motor oil in the engine's oil paths alter the required motor oil is added to the engine 10 and the engine is started.

Lastly, in step 112, the oil filter adapter 15 may be removed and replaced with a new-oil filter (not shown). The required motor oil is then added to the engine 10, per vehicle specification.

It should be understood that some or all of the valves, sensors or other components (e.g., the pump) of the engine cleaning machine 70 depicted aid described in this disclosure may be configured to be controlled by the control unit 50. To do so, it should be understood that the control unit 50 may incorporate logic necessary to control and thus partially or fully automate the processes, steps and/or functions disclosed herein. For example, a programmer of ordinary skill could write software based on the information provided herein (e.g., component(s) that should be actuated during a step, duration of the step, etc.).

It may be advantageous to set forth definitions of certain words and phrases used in this patent document.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

If means-plus-function limitations are recited in the claims, the means are not intended to be limited to the means disclosed in this application for performing the recited function, but are intended to cover in scope any equivalent means, known now or later developed, for performing the recited function.

Claims directed to a method and/or process should not be limited to the performance of their steps in the order written, and one skilled in the art can readily appreciate that the sequences may be varied and still remain within the spirit and scope of the invention.

What is claimed is:

1. A cleaning machine to clean an engine, where the engine has an oil pump to circulate oil therethrough and an oil drain from which to drain the circulated oil therefrom, said cleaning machine comprising:
   a source of engine cleaning fluid;
   a cleaning fluid pump lying in fluid communication with said source of engine cleaning fluid to pump the engine cleaning fluid from said source;
   a cleaning fluid inlet line extending between said cleaning fluid pump and the engine to supply the engine cleaning fluid being pumped by said cleaning fluid pump from said source thereof to the engine to flow therethrough;
   a cleaning fluid outlet line extending between the engine and said cleaning fluid inlet line such that a first portion of the engine cleaning fluid flowing through the engine is recycled by way of said cleaning fluid outlet line and said cleaning fluid inlet line to the engine by means of the engine oil pump; and
   an oil drain outlet line extending between the engine oil drain and said cleaning fluid inlet line by way of said cleaning fluid pump such that a second portion of the engine cleaning fluid flowing through the engine is recycled by way of said oil drain outlet line and said cleaning fluid inlet line to the engine by means of said cleaning fluid pump.

2. The cleaning machine recited in claim 1, further comprising a first 3-way valve coupled to each of said source of engine cleaning fluid, said cleaning fluid pump, and said oil drain outlet line, said first 3-way valve being operable to selectively control the communication of one of said source of engine cleaning fluid or said oil drain outlet line with said cleaning fluid pump.

3. The cleaning machine recited in claim 2, further comprising a filter located between said oil drain outlet line and said first 3-way valve to filter the second portion of the engine cleaning fluid that is recycled by said cleaning fluid pump to the engine.

4. The cleaning machine recited in claim 2, further comprising a cleaning fluid transfer tank located between said cleaning fluid pump and said cleaning fluid inlet line to receive the engine cleaning fluid being pumped from said source of engine cleaning fluid by said cleaning fluid pump and to also receive the second portion of the engine cleaning fluid being recycled by said cleaning fluid pump to the engine.

5. The cleaning machine recited in claim 4, wherein said cleaning fluid transfer tank is also located between said cleaning fluid outlet line and said cleaning fluid inlet line to additionally receive the first portion of the engine cleaning fluid flowing through the engine and being recycled by said engine oil pump to the engine.

6. The cleaning machine recited in claim 5, wherein said cleaning fluid transfer tank includes a first filter to filter the engine cleaning fluid received from said source thereof and the first and second portions of the engine cleaning fluid flowing through and recycled to the engine.

7. The cleaning machine recited in claim 5, further comprising a unidirectional valve located between said cleaning fluid pump and said cleaning fluid transfer tank to prevent the back flow of the engine cleaning fluid from said cleaning fluid transfer tank to said cleaning fluid pump.

8. The cleaning machine recited in claim 5, further comprising a unidirectional valve located between said cleaning fluid outlet line and said cleaning fluid transfer tank to prevent the back flow of the engine cleaning fluid from said cleaning fluid transfer tank to said cleaning fluid outlet line.

9. The cleaning machine recited in claim 5, further comprising a cleaning fluid return line extending between said cleaning fluid transfer tank and said source of engine cleaning fluid to return the engine cleaning fluid received by said cleaning fluid transfer tank to said source of engine cleaning fluid, and a second 3-way valve coupled to each of said cleaning fluid return line, said cleaning fluid transfer tank, and said cleaning fluid inlet line, said second 3-way valve being operable to selectively control the communication of said cleaning fluid transfer tank with one of said cleaning fluid inlet line or said cleaning fluid return line.

10. The cleaning machine recited in claim 9, further comprising a second filter connected in said cleaning fluid return line to filter the engine cleaning fluid returned from said cleaning fluid transfer tank to said source of engine cleaning fluid by way of said cleaning fluid return line when said second 3-way valve is operated and said cleaning fluid transfer tank communicates with said cleaning fluid return line.

11. The cleaning machine recited in claim 1, further comprising a source of air under pressure and an air supply line extending between said source of air under pressure and said cleaning fluid inlet line such that air under pressure is blown from said source thereof to the engine by way of said air supply line and said cleaning fluid inlet line.

\* \* \* \* \*